US 8,205,905 B2

(12) United States Patent
Zilm (10) Patent No.: US 8,205,905 B2
(45) Date of Patent: Jun. 26, 2012

(54) METHODS AND APPARATUS FOR BALL AND SOCKET COUPLING (76) Inventor: William M. Zilm, Glenwood Springs, CO (US)

( * ) Notice: Subject to any disclaimer, the term of this patent is extended or adjusted under 35 U.S.C. 154(b) by 0 days.

(21) Appl. No.: 13/102,729

(22) Filed: May 6, 2011

(65) Prior Publication Data
US 2012/0043738 A1 Feb. 23, 2012

Related U.S. Application Data (63) Continuation of application No. PCT/US2009/056856, filed on Sep. 14, 2009.

(51) Int. Cl.
B62D 1/06 (2006.01)
(52) U.S. Cl. ........................ 280/512; 280/511
(58) Field of Classification Search .................. 280/513, 280/512, 511, 477, 478.1, 479.3; 403/24
See application file for complete search history.

(56) References Cited

U.S. PATENT DOCUMENTS

| 2,115,629 A | * | 4/1938 | Gurley | 280/512 |
|---|---|---|---|---|
| 2,125,479 A | * | 8/1938 | Zagelmeyer | 280/511 |
| 2,219,955 A | * | 10/1940 | Gilmore | 280/511 |
| 2,475,878 A | * | 7/1949 | Clark et al. | 280/512 |
| 3,046,038 A | * | 7/1962 | Hollis | 280/512 |
| 3,257,126 A | * | 6/1966 | Robertson | 280/511 |
| 3,366,402 A | * | 1/1968 | Bennett | 280/512 |
| 3,442,534 A | * | 5/1969 | McCorkle | 280/511 |
| 3,947,839 A | * | 3/1976 | Zigmant | 340/431 |
| 4,042,256 A | * | 8/1977 | Lepp | 280/512 |
| 4,114,922 A | * | 9/1978 | Holbrook | 280/512 |
| 4,545,596 A |  | 10/1985 | Luke et al. |  |
| 4,844,498 A |  | 7/1989 | Kerins et al. |  |
| 5,205,666 A | * | 4/1993 | Hollis | 403/24 |
| 5,887,885 A |  | 3/1999 | Byers et al. |  |
| 5,890,728 A |  | 4/1999 | Zilm |  |
| 5,909,891 A | * | 6/1999 | Swart et al. | 280/422 |
| 6,089,591 A |  | 7/2000 | Thomas |  |

(Continued)

FOREIGN PATENT DOCUMENTS
AU 736 557 5/2001
(Continued)

OTHER PUBLICATIONS

International Patent Application No. PCT/US2009/056856, filed Sep. 14, 2009, International Search Report dated Nov. 3, 2009.
International Patent Application No. PCT/US2009/056856, filed Sep. 14, 2009, Written Opinion of the International Searching Authority dated Nov. 3, 2009.

Primary Examiner — Lesley D. Morris
Assistant Examiner — Daniel Yeagley
(74) Attorney, Agent, or Firm — Santangelo Law Offices, P.C.

(57) ABSTRACT

Methods and apparatus may permit a ball and socket coupling arrangement. A rotary interference member (2) and a rotary socket member (8) may be displaced from a hitch ball interference position (6) and a hitch ball socket position (11), respectively, to a hitch ball clearance position (7) by a hitch ball (17) moving through a trailer coupling path (27). A hitch ball socket (15) may be formed in part by a socket engagement surface (9) of a rotary socket member (8). A hitch ball guidance cone (21) may guide the hitch ball (17) through the trailer coupling path (27). A control rod (34) may be used to displace the rotary interference member (2) and the rotary socket member (8) from a hitch ball interference position (6) and a hitch ball socket position (11), respectively, to a hitch ball clearance position (7).

41 Claims, 6 Drawing Sheets

U.S. PATENT DOCUMENTS

| | | | |
|---|---|---|---|
| 6,186,530 B1 | 2/2001 | Zilm | |
| 6,980,096 B1 * | 12/2005 | Washington et al. | 340/431 |
| 7,434,826 B1 * | 10/2008 | Lambros | 280/508 |
| 7,588,262 B1 | 9/2009 | Zilm | |
| 7,963,545 B2 * | 6/2011 | Coy | 280/511 |
| 8,047,559 B2 * | 11/2011 | Harlin | 280/477 |
| 2004/0135346 A1 | 7/2004 | Moss | |
| 2007/0018428 A1 | 1/2007 | Allen | |
| 2009/0121452 A1 | 5/2009 | Zilm | |

FOREIGN PATENT DOCUMENTS

| | | |
|---|---|---|
| CA | 2235167 | 12/2005 |
| DE | 3416631 A1 * | 11/1985 |
| WO | 2005095130 | 10/2005 |
| WO | 2009064796 | 5/2009 |
| WO | 2011031274 A1 | 3/2011 |

* cited by examiner

METHODS AND APPARATUS FOR BALL AND SOCKET COUPLING

This application is a continuation of International Application No. PCT/US2009/056856, filed 14 Sep. 2009, said patent application and any priority case hereby incorporated herein by reference in its entirety.

TECHNICAL FIELD

Generally, the inventive technology relates to a ball and socket coupling system. More particularly, the inventive technology involves novel methods and apparatus for guiding a ball through a coupling path and locking the ball into a socket. The inventive technology may be particularly suited to the hitch ball coupling of tow vehicles to trailers of various kinds and configurations.

BACKGROUND

Today's pickup truck is a very versatile vehicle that can be used for work as well as play. Pickup trucks may be particularly suited to the task of towing. They may be suitable for towing other vehicles, boats, campers, horse trailers, equipment and the like. In each of these applications, a hitch may be required to attach the load to the truck.

Several styles of hitches may exist. Bumper mounted ball hitches may be useful for lighter loads, but for heavier loads the hitch may be located in the bed of the pickup just above the rear axle. For instance, a popular style of bed mounted hitch system may be known as a "gooseneck" hitch. A gooseneck hitch may employ a ball and socket arrangement where the hitch ball may be mounted in the bed of the pickup and the socket may be part of the trailer. This arrangement may be very common on horse trailers, among others.

The substantial weight of a loaded gooseneck trailer may require proper loading and mounting of the hitch assembly. Where the typical pickup truck is employed as the tow vehicle, the hitch ball may be secured in the bed of the pickup truck above and slightly in front of the rear axle. Typically, the mounting perhaps may need to be located not too far forward of the axle to avoid unnecessary bending moments about the axle. Moreover, the hitch ball generally may not be mounted to the rear of the axle, otherwise the tow vehicle may tend to rear off of its front wheels, possibly resulting in loss of steering control.

Recently, the popularity of the short-bed pickup truck has grown. Here, there may be a decreased distance between the rear axle of the pickup truck and the cab. In such cases, the proper mounting of the hitch ball often may result in an inadequate clearance distance between the forward portion of the trailer and the truck cab. In order to achieve adequate clearance, the tow hitch may be moved rearwardly in the bed, behind the rear axle. However, as noted above, this may create an undesirable and potentially dangerous towing configuration.

To address this problem, the coupling extension of a trailer may be angled so that the trailer extension may be joined to the hitch ball in front of the rear axle, while the front of the trailer may be displaced from the back of the cab with sufficient distance to allow the trailer to safely clear the cab during turns. Examples may be shown in U.S. Pat. No. 5,890,728, granted Apr. 6, 1999; U.S. Pat. No. 6,186,530, granted Feb. 13, 2001; U.S. patent application Ser. No. 11/939,468, filed Nov. 13, 2007; and U.S. patent application Ser. No. 12/098,327, filed Apr. 4, 2008; each hereby incorporated herein by reference.

However, the trailer coupling systems utilized in these examples may have several drawbacks. For example, these trailer coupling systems may require top-down coupling, wherein the trailer extension may need to be set at a certain height, the hitch ball may need to be positioned relatively precisely directly under the trailer extension, and the trailer extension may need to be lowered vertically to engage the hitch ball. This procedure may require a fair amount of operator skill to carry out, and in any case may be relatively time consuming. Moreover, the trailer coupling systems described in the examples may be relatively heavy, perhaps tending to decrease towing efficiency, and may contain a relatively large number of moving parts, perhaps tending to increase manufacturing and maintenance costs.

The foregoing problems related to conventional trailer coupling systems may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

Additionally, while the foregoing discussion has used the concept of pickup trucks and trailers to exemplify various problems of conventional ball and socket coupling arrangements, these problems of course may be present in a great variety of applications employing conventional ball and socket coupling arrangements, not limited to just pick up truck embodiments or even just towing applications.

SUMMARY DISCLOSURE OF THE INVENTION

The inventive technology relates to methods and apparatus for ball and socket coupling and may include the following features: bifurcated techniques for hitching a trailer in a ball and socket arrangement; techniques for guiding a hitch ball through a trailer coupling path in a ball and socket arrangement; techniques for forming socket surfaces from moving parts in a ball and socket arrangement; and techniques for stabilizing a hitch ball in a ball and socket arrangement with a stabilization pin. Accordingly, the objects of the methods and apparatus for ball and socket coupling described herein address each of the foregoing in a practical manner. Naturally, further objects of the inventive technology will become apparent from the description and drawings below.

MODES FOR CARRYING OUT THE INVENTION

The present inventive technology includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 2:
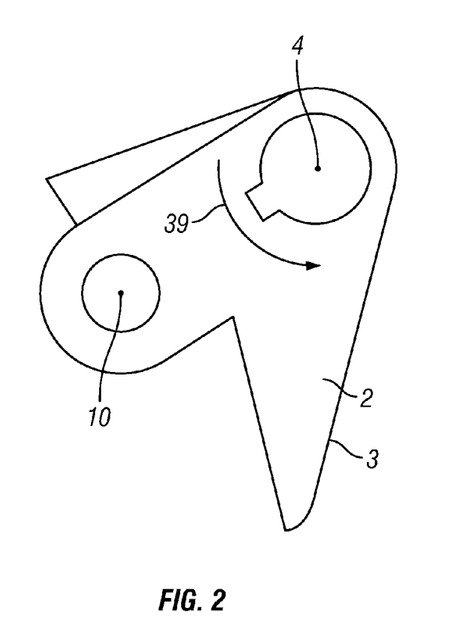
FIG. 2 is a side view of a rotary interference member in one exemplary embodiment.
Figure 3:
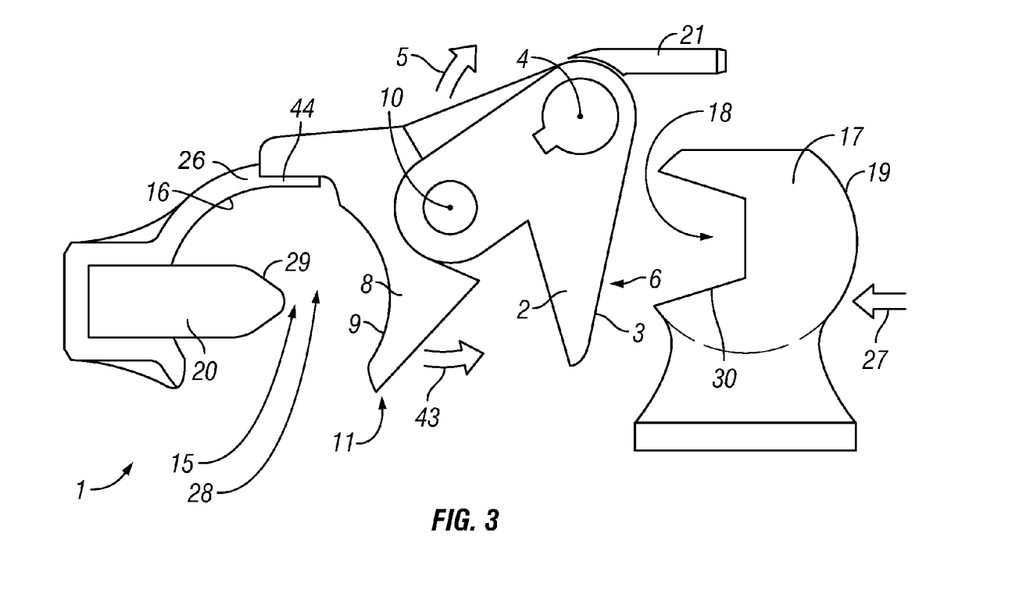
FIG. 3 is a side view of a bifurcated trailer hitch apparatus showing an unseated hitch ball in one exemplary embodiment.

Now referring primarily to FIG. 2, the inventive technology may utilize a rotary interference member (2) having a first pivot point (4) and a second pivot point (10). A rotary interference member (2) may be any member capable of rotating about first pivot point (4) and interfering with a hitch ball (17) moving through trailer coupling path (27). For example, a rotary interference member (2) in various embodiments may be a cam arm, a lever arm, or the like. Interference may result when a hitch ball (17) moving through a trailer coupling path (27) contacts a hitch ball contact surface (3).

Figure 1:
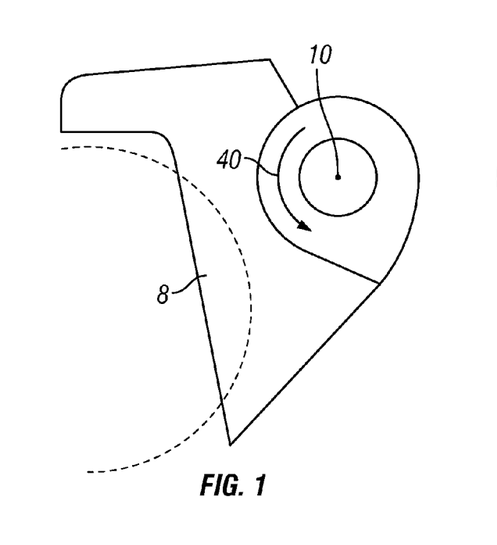
FIG. 1 is a side view of a rotary socket member in one exemplary embodiment.

Now referring primarily to FIG. 1, the inventive technology further may utilize a rotary socket member (8) joined to a rotary interference member (2) at a second pivot point (10). A rotary socket member (8) may be any member capable of rotating about the second pivot point (10) and forming a hitch ball socket (15) at the terminus of a trailer coupling path (27). For example, a rotary socket member (8) may include a socket engagement surface (9), which may be capable of engaging part or all of hitch ball (17). In various embodiments, a rotary socket member (8) may be for example a cam, a lever, or the like. Moreover, engaging part or all of a hitch ball (17) may involve substantially spherically wrapping about a hitch ball (17).

Now referring primarily to FIGS. 3-6, a rotary interference member (2) and a rotary socket member (8) may be part of a bifurcated trailer hitch apparatus (1), for example wherein each member may be seen to be a constituent part of the bifurcated apparatus. A first pivot point (4) of a rotary interference member (2) may define a rotational range of motion of the rotary interference member (2). The bifurcated trailer hitch apparatus (1) accordingly may include an unobstructed arc (5) coincident with such a rotational range of motion. Additionally, a second pivot point (10) of a rotary socket member (8) may define a rotational range of motion of the rotary socket member (8). The bifurcated trailer hitch apparatus (1) accordingly may include an unobstructed arc (43) coincident with such a rotational range of motion.

The unobstructed arc (5) of a rotary interference member (2) may include a hitch ball interference position (6) and a hitch ball clearance position (7). For example, in a hitch ball interference position (6), the rotary interference member (2) may lie within, block, or otherwise interfere with the motion of a hitch ball (17) moving through a trailer coupling path (27). By way of contrast, a rotary interference member (2) in a hitch ball clearance position (7) may be displaced from, not interfere with, or otherwise lie clear of a hitch ball (17) moving through a trailer coupling path (27). In some embodiments, passage of the hitch ball (17) may displace the rotary interference member (2) from a hitch ball interference position (6) to a hitch ball clearance position (7).

The unobstructed arc (43) of a rotary socket member (8) may include a hitch ball socket position (11) and a hitch ball clearance position (7). The hitch ball socket position (11) may result when a socket engagement surface (9) of the rotary socket member (8) is positioned to engage a hitch ball (17). For example, when a rotary interference member (2) is in a hitch ball interference position (6), the rotary socket member (8) necessarily may be in a hitch ball socket position (11) due to the nature of the connection of the two members about the second pivot point (10). By way of contrast, a rotary socket member (8) in a hitch ball clearance position (7) may be displaced from, not interfere with, or otherwise lie clear of a hitch ball (17) moving through a trailer coupling path (27). In some embodiments, rotation of the rotary interference member (2) from a hitch ball interference position (6) to a hitch ball clearance position (7) may cause the rotary socket member (8) to rotate from a hitch ball socket position (11) to a hitch ball clearance position (7).

In the foregoing manner, the inventive technology may involve a bifurcated method for hitching a trailer. The method may include moving a hitch ball (17) through a trailer coupling path (27), such as shown for example in FIG. 3. Moving the hitch ball (17) in this manner may result in contacting the hitch ball (17) to a hitch ball contact surface (3) of a rotary interference member (2), such as shown for example in FIG. 4. The rotary interference member (2) may be in a hitch ball interference position (6) when contact is made. Continuing movement of the hitch ball (17) along the trailer coupling path (27) may result in displacing the rotary interference member (2) from its hitch ball interference position (6) to a hitch ball clearance position (7), such as shown for example in FIG. 5, as the hitch ball (17) slides along the hitch ball contact surface (3). In particular, the rotary interference member (2) may be displaced through the unobstructed arc (5) coinciding with its rotational range of motion defined by its first pivot point (4).

The displacement of the rotary interference member (2) by hitch ball (17) may cause the displacement of rotary socket member (8), to the extent that the two members are joined about the second pivot point (10). In particular, as the rotary interference member (2) rotates about the first pivot point (4), the rotary socket member (8) may counter-rotate about the second pivot point (10). This may result in displacing the rotary socket member (8) from a hitch ball socket position (11) to a hitch ball clearance position (7), such as shown for example in FIG. 5, through the unobstructed arc (43) coinciding with its rotational range of motion defined by its second pivot point (10).

As the hitch ball (17) continues to move along the trailer coupling path (27), it eventually traverses hitch ball contact surface (3) and moves past rotary interference member (2) and rotary socket member (8). At this point, rotary interference member (2) may drop back into hitch ball interference position (6), causing rotary socket member (8) to drop back into hitch ball socket position (11), such as shown for example in FIG. 6.

Now with reference primarily to FIGS. 1-6, the inventive technology in various embodiments may involve biasing a rotary interference member (2) or a rotary socket member (8). For example, a rotary interference member (2) may be provided with a bias (39) towards a hitch ball interference position (6) and a rotary socket member (8) may be provided with a bias (40) towards a hitch ball clearance position (7). Biasing the members in this fashion may facilitate movement of the members between a hitch ball interference position (6) and a hitch ball clearance position (7) as a hitch ball (17) moves through a trailer coupling path (27). For example, the bias (39) of the rotary interference member (2) toward a hitch ball interference position (6) may tend to fix the member in such a position until it is disturbed by an external force. Naturally, movement of a hitch ball (17) through a trailer coupling path (27) can provide just such a force, overcoming the bias (39) so as to displace the rotary interference member (2) to a hitch ball clearance position (7).

Although the rotary socket member (8) may have a bias (40) toward a hitch ball clearance position (7), it may be held against this bias (40) in a hitch ball socket position (11) by making the bias (39) of the rotary interference member (2) stronger than the bias (40) of the rotary socket member (8). In this configuration, the relatively stronger bias (39) of the rotary interference member (2) will tend to fix both members in a hitch ball interference position (6). However, a retention element (44) additionally may be provided to retain rotary socket member (8) in a hitch ball socket position (11). The retention element (44) may tend to overcome the relatively weaker bias (40) of the rotary socket member (8), so that even as the rotary socket member (8) is forced toward the hitch ball interference position (6) by the relatively stronger bias (39) of the rotary interference member (2), the retention element (44) tends to overcome the relatively weaker bias (40) of the rotary socket member (8), holding the rotary socket member (8) in the hitch ball socket position (11).

Figure 4:
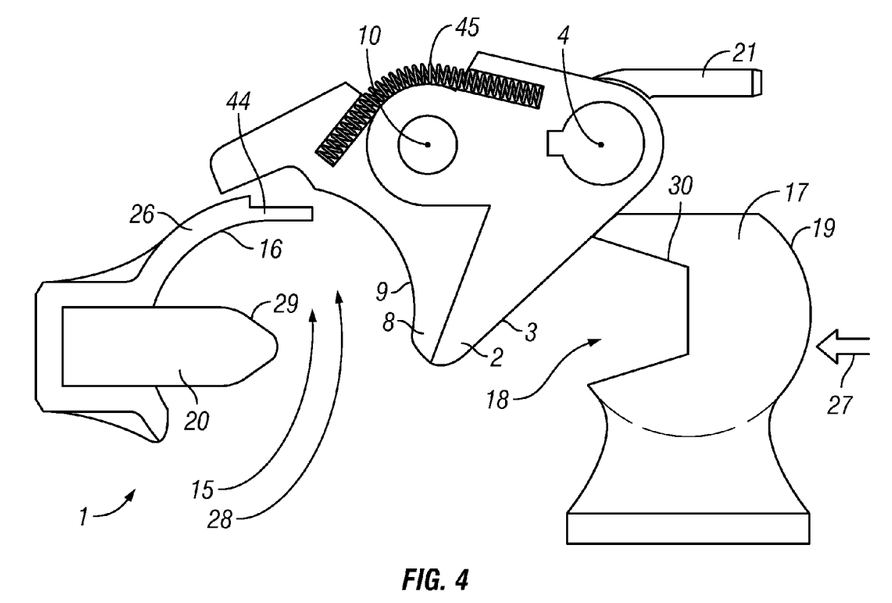
FIG. 4 is a side view of a bifurcated trailer hitch apparatus showing a rotary interference member and a rotary socket member being displaced by a hitch ball in one exemplary embodiment.
Figure 5:
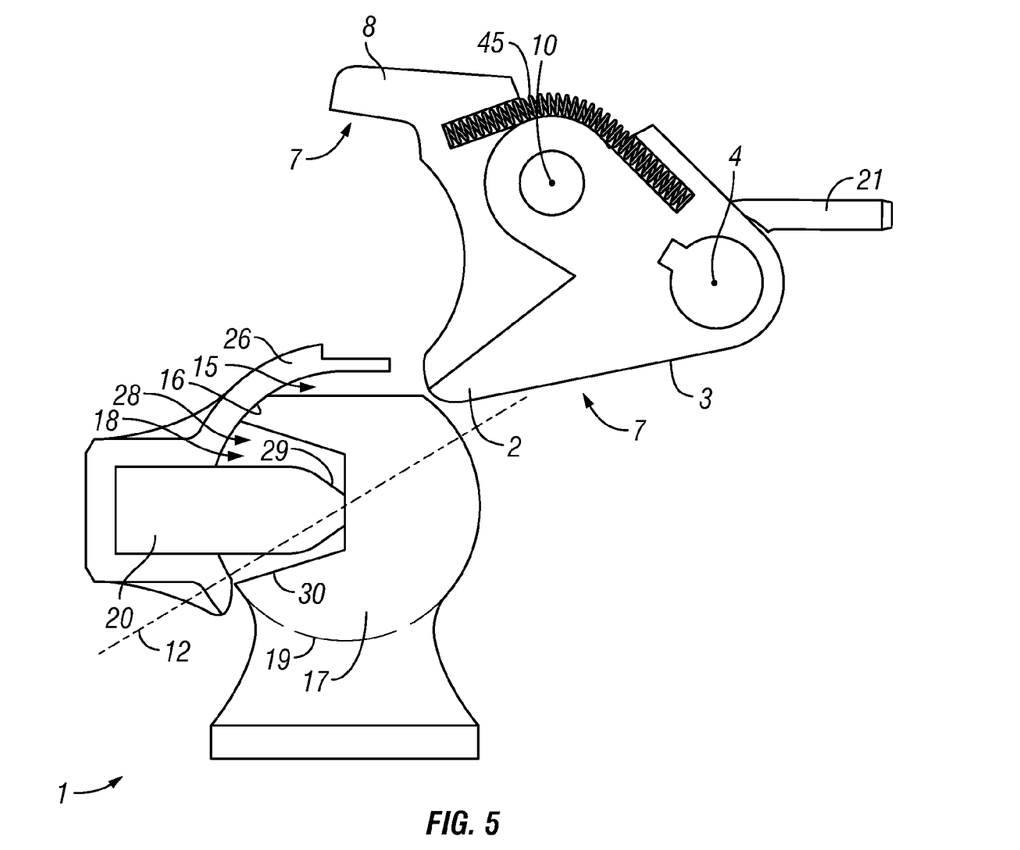
FIG. 5 is a side view of a bifurcated trailer hitch apparatus showing a rotary interference member and a rotary socket member in a hitch ball clearance position in one exemplary embodiment.

Of course, when hitch ball (17) moves through trailer coupling path (27) and overcomes the relatively stronger bias (39), rotary interference member (2) may be displaced upward towards a hitch ball clearance position (7), such as shown for example in FIGS. 4 and 5. This displacement will tend to lift rotary socket member (8) off of the retention element (44). Since retention element (44) no longer acts to overcome the relatively weaker bias (40), this bias becomes enabled and will tend to cause rotary socket member (8) to rotate into a hitch ball clearance position (7) simultaneously as rotary interference member (2) is being displaced into a hitch ball clearance position (7), again such as shown for example in FIGS. 4 and 5.

Now with further reference to FIGS. 3-6, the effect of biasing the rotary interference member (2) and the rotary socket member (8) can be seen. When no external forces are present, the combination of the relatively stronger bias (39) of the rotary interference member (2), the relatively weaker bias (40) of the rotary socket member (8), and the retention element (44) tend to hold the members in the configuration shown in FIG. 3. When an external force overcomes the relatively stronger bias (39) of rotary interference member (2), such as when hitch ball (17) contacts hitch ball contact surface (3) as the ball moves through a trailer coupling path (27), the members tend to assume the configuration shown in FIG. 4. When the rotary interference member (2) and the rotary socket member (8) are moved into a hitch ball clearance position (7), the members tend to assume the configuration shown in FIG. 5. When the external force is removed, such as when hitch ball (17) moves past rotary interference member (2) and rotary socket member (8), the members tend to return the positions shown in FIG. 6.

Naturally, any suitable device or technique may be used to create the biases consistent with principles discussed herein. For example, with reference to FIGS. 4 and 5, some embodiments may use a spring-loaded bias 45.

From a review of FIGS. 3-6, it will be apparent that a first pivot point (4) and a second pivot point (10) may be counter rotational pivot points—when both pivot points are in motion, one may rotate in the opposite direction as the other. For example, when first pivot point (4) rotates in a clockwise direction, this may cause second pivot point (10) to rotate in a counter-clockwise direction, and vice-versa.

Figure 6:
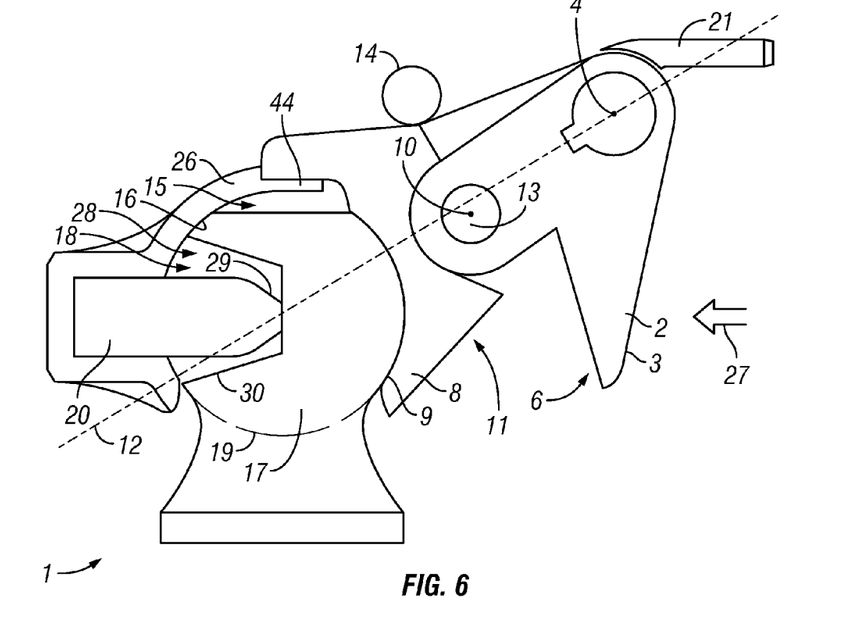
FIG. 6 is a side view of a bifurcated trailer hitch apparatus showing a seated hitch ball in one exemplary embodiment.

With reference to FIG. 6, some embodiments may include a pivot counteraction safety latch (14). This may involve counteracting the pivoting motion of the first pivot point (4) and the second pivot point (10), such as to ensure rotary interference member (2) and rotary socket member (8) stay in a hitch ball interference position (6) and a hitch ball socket position (11) respectively. This may be useful, for example, when a hitch ball (17) is seated in a hitch ball socket (15), such as to prevent accidental displacement of rotary interference member (2) and rotary socket member (8) and accidental release of the hitch ball (17), as for example when the hitch ball (17) may be used to tow a trailer. Naturally, any suitable device or technique may be used to counteract the rotation of the pivot points consistent with the principles discussed herein. In some embodiments, a safety latch may be used to block the pivoting motion of the pivot points, such a safety latch perhaps having an "on" position to lock the pivot points in place and an "off" position to allow the pivot points to rotate.

With reference to FIG. 6, some embodiments may include a medial lock axis (12). This may be an axis connecting the center of a hitch ball (17) seated in a hitch ball socket (15) and the first pivot point (4) when rotary interference member (2) is in a hitch ball interference position (6) and rotary socket member (8) is in a hitch ball socket position (11). When the second pivot point (10) is located below this axis, it may be seen to be in a sub-medial lock axis position (13). Moving the second pivot point (10) into a sub-medial lock axis position (13), such as when a hitch ball (17) has moved through a trailer coupling path (27) and is seated in a hitch ball socket (15), may confer additional stability tending to hold the rotary socket member (8) into a hitch ball socket position (11).

Figure 7:
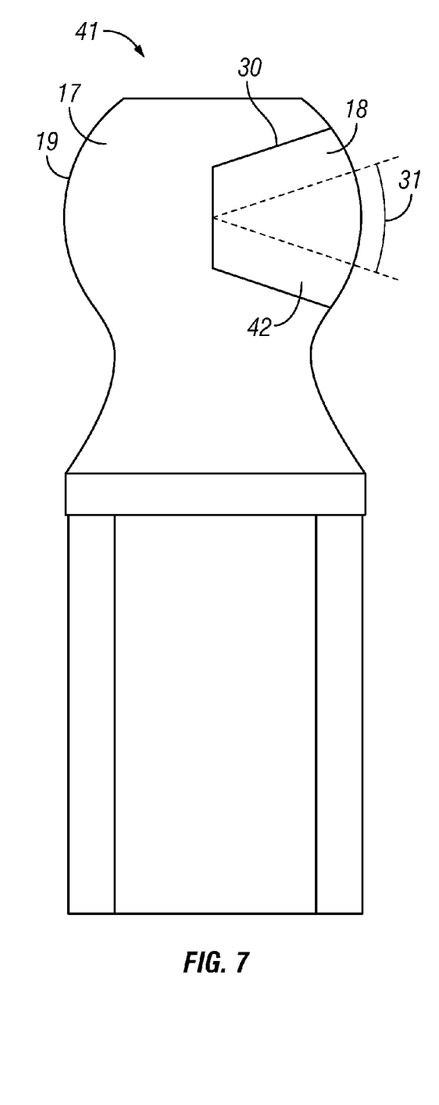
FIG. 7 is a side view of a hitch ball having a recessed space disposed into a socket reception surface in one exemplary embodiment.
Figure 8:
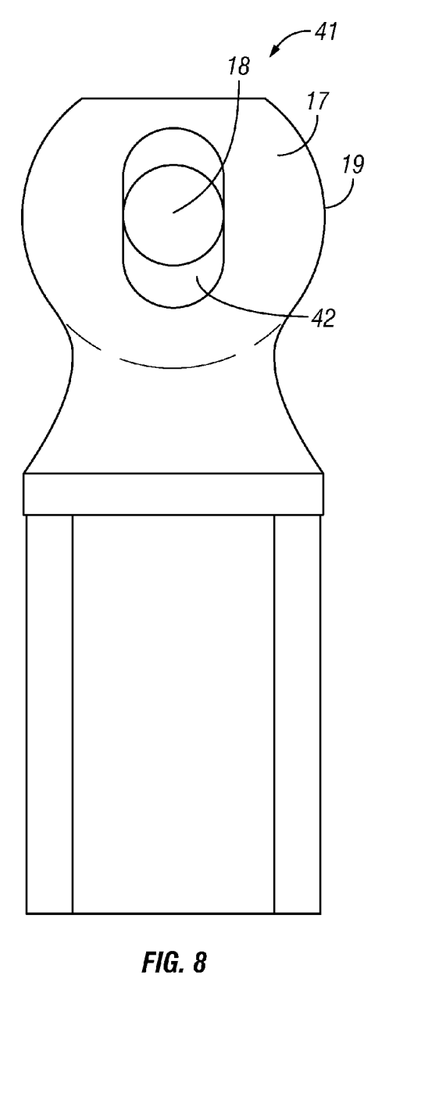
FIG. 8 is a rear view of a hitch ball having a recessed space disposed into a socket reception surface in one exemplary embodiment.

Referring now primarily to FIGS. 7-8, the inventive technology in various embodiments may include a trailer stabilization apparatus (41). The trailer stabilization apparatus (41) may utilize a hitch ball (17) having a socket reception surface (19). The hitch ball (17) may be any ball capable of utilization in a ball and socket coupling arrangement, for example including but not limited to hitch balls utilized by gooseneck trailers. A socket reception surface (19) simply may be any surface of a hitch ball (17) configured to be received within the socket of a ball and socket coupling arrangement, for example including but not limited to an essentially spherical surface as may be typically utilized for trailer hitches.

A trailer stabilization apparatus (41) in various embodiments also may include a trailer stabilization element. A trailer stabilization element may be an element that, when joined to a hitch ball (17), imparts a stabilizing effect tending to counteract movement of the hitch ball (17) in at least one direction. While naturally more than one configuration may be suitable to accomplish this, in some embodiments a trailer stabilization element may be a trailer stabilization pin (20), and a hitch ball (17) may have a recessed space (18) disposed into its socket reception surface (19) having a dimensional configuration (42) coordinated to accommodate the trailer stabilization pin (20). The dimensional configuration (42) may include attributes such as height, width, depth, shape, or any other attribute contributing to the dimensions of the recessed space (18). It may be appreciated that such coordination of the dimensional configuration (42) of the recessed space (18) may provide wide latitude for the utilization of trailer stabilization pins (20) of various kinds and configurations. For example, some embodiments may involve dimensioning a configuration of the recessed space (18) to be coordinated with a load capacity of the hitch ball (17), such as where slimmer, more lightweight pins may be adequate where the hitch ball (17) will be used for lighter loads, or where thicker, more heavyweight pins may be required where the hitch ball (17) will be used for heavier loads.

Dimensioning a configuration of the recessed space (18) also may involve a pin taper (29) of the trailer stabilization pin (20) and a recess taper (30) of the recessed space (18). A pin, for example, may be wider at its base than at its tip, and a recess may be complementarily dimensioned to be wider at its opening and narrower at its terminus. In manners such as this, tapers may form an alignment tolerance (31) at the juncture of the trailer stabilization pin (20) and the recessed space (18). For example, the tapers may permit a misaligned pin nevertheless to become properly seated within the recess, in as much as the misaligned pin may contact one of the tapered surfaces of the recess, and the relative tapers may guide the pin to a properly seated position. In this manner, a trailer stabilization apparatus (41) may involve correcting insertion misalignment within an alignment tolerance created by the pin taper (29) and the recess taper (30). In some embodiments, up to 18 degrees of off-center insertion misalignment may be corrected in this manner.

Naturally, a trailer stabilization pin (20) may impart any stabilizing effect tending to counteract movement of the hitch ball (17) in at least one direction consistent with the principles discussed herein. In some embodiments, for example, a trailer stabilization pin (20) may be a yaw counteraction pin. When the pin is seated within a hitch ball (17) in the configuration shown, for example, in FIG. 6, the stabilizing effect of the pin may be to counteract trailer yaw, for example by restricting yaw movement of the hitch ball (17) about the pin.

A trailer stabilization pin (20) of course also may provided in any configuration suitable for joinder to a hitch ball (17). In various embodiments, for example, a trailer stabilization pin (20) may be joined to a hitch ball seat element, such as a hitch ball seat cone (26), or may be otherwise secured with a hitch ball (17) within a bifurcated trailer hitch apparatus (1).

Now with further reference primarily to FIGS. 3-6, a bifurcated trailer hitch apparatus (1) in various embodiments may include a hitch ball socket (15) formed at least in part by a socket engagement surface (9) of a rotary socket member (8) and formed at least in part by socket engagement surface (16) of a hitch ball seat element, such as hitch ball seat cone (26). A socket engagement surface simply may be any surface configured to engage a socket reception surface (19), such as of a hitch ball (17), within a ball and socket coupling arrangement. The hitch ball socket (15) may be formed in part by moving the rotary socket member (8) from a hitch ball clearance position (7) to a hitch ball socket position (11). This may place the socket engagement surface (9) of the rotary socket member (8) into position to complete the hitch ball socket (15) along with the socket engagement surface (16) of the hitch ball seat element. Moreover, engaging part or all of a hitch ball (17) may involve substantially spherically wrapping about a hitch ball (17).

Moving the rotary socket member (8) in this manner may result from moving a hitch ball (17) through trailer coupling path (27) and seating the hitch ball (17) in a hitch ball seat element. For example, where a hitch ball seat element is positioned at the terminus of the trailer coupling path (27), seating the hitch ball (17) may mean that the hitch ball (17) has moved past rotary interference member (2) and rotary socket member (8), causing these members to return to their hitch ball interference position (6) and hitch ball socket position (11), respectively.

Naturally, a hitch ball (17) may be seated in a hitch ball socket (15), such as in the manner just described. Moreover, seating the hitch ball (17) may involve inserting a trailer stabilization pin (20) into a recessed space (18) disposed into a socket reception surface (19) of the hitch ball (17). For example, the trailer stabilization pin (20) may be disposed within a hitch ball socket space (28) such that it is complementarily aligned to the recessed space (18) of the hitch ball (17). As the hitch ball (17) moves through trailer coupling path (27) and enters the hitch ball socket space (28), the stabilization pin (20) may be received into the recessed space (18). Upon completing its movement through trailer coupling path (27) and becoming seated in hitch ball socket (15), the trailer stabilization pin (20) may be fully disposed within recessed space (18).

Now with reference primarily to FIGS. 9-12, a bifurcated trailer hitch apparatus (1) in various embodiments may utilize a hitch ball guidance element. The hitch ball guidance element may serve to guide a hitch ball (17) as the hitch ball (17) is moved through a trailer coupling path (27), such as to ensure the hitch ball (17) is guided accurately to be seated in a hitch ball socket (15). For example, guiding a hitch ball (17) may involve confining movement of the hitch ball (17). Naturally, any suitable element capable of guiding a hitch ball (17) consistent with the principles discussed herein may be utilized, made of any suitable material and in any suitable configuration as appropriate. In some embodiments, for example, a hitch ball guidance element may be a hitch ball guidance cone (21).

In addition to guiding a hitch ball (17) through a trailer coupling path (27), a hitch ball guidance cone (21) also may be disposed about a rotary interference member (2) and a rotary socket member (8), such as by encompassing, partly encircling, or completely encircling the members within the inner volume of the cone. For example, the rotary interference member (2) may be partially or completely suspended within the cone, such as positioned in part or completely below an inside top surface of the cone.

The hitch ball guidance cone (21) further may be provided with a superior clearance opening (22) and an inferior clearance opening (23) disposed through the cone. The superior clearance opening (22) may be disposed through a top section of the cone and may be dimensioned to accommodate each unobstructed arc (5) and (43) coincident with each rotational range of motion of the rotary interference member (2) and the rotary socket member (8), such that the members are free to move back and forth through the superior clearance opening (22) when displaced between a hitch ball clearance position (7) and a hitch ball interference position (6) or hitch ball socket position (11), respectively.

The inferior clearance opening (23) may be disposed through a bottom section of the cone, and may provide a space to accommodate a hitch ball (17) moving through a trailer coupling path (27). For example, the hitch ball (17) may pass through the inferior clearance opening (23) such that its lower portion, perhaps mounted on a tow vehicle such as a pick-up truck, passes outside of the interior volume of the cone, while its upper portion, perhaps the socket reception surface (19) of the hitch ball (17), may pass within the interior volume of the cone and perhaps may be guided by the taper of the cone toward a hitch ball seat element. Naturally, the inferior clearance opening (23) may be of any suitable size consistent with the guidance function of the cone described in herein. In some embodiments, the inferior clearance opening (23) may have an angular width of up to 120 degrees, as measured from the centerline through the cone, and perhaps may be formed simply by sectioning off a bottom surface of the cone until an opening of suitable size is formed.

The superior clearance opening (22) and the inferior clearance opening (23) may ensure that the hitch ball guidance cone (21) can guide the hitch ball (17) through a trailer coupling path (27) even as the hitch ball (17) displaces the rotary interference member (2) and the rotary socket member (8). For example, embodiments may involve confining movement of the hitch ball (17) within the inferior clearance opening (23), contacting the hitch ball (17) to a hitch ball contact surface (3) of a rotary interference member (2) within the hitch ball guidance cone (21), and displacing the rotary interference member (2) and the rotary socket member (8) through a superior clearance opening (22). Moreover, the cone may configured such that a rotary interference member (2) and a rotary socket member (8) displaced through a superior clearance opening (22) form a flush interior surface of the cone. For example, when displaced into their hitch ball clearance positions (7), the bodies of the rotary interference member (2) and rotary socket member (8) may lie substantially outside of the interior volume of the cone, but their surface portions facing the interior volume of the cone in fact may be flush with the interior surface of the cone, perhaps helping to form the guidance surface of the cone.

With further reference primarily to FIGS. 9-12, a bifurcated trailer hitch apparatus (1) in various embodiments may utilize a hitch ball seat element. A hitch ball seat element may provide a secure seating for a hitch ball (17) within a hitch ball socket (15), such as to effect a secure ball and socket coupling arrangement. Naturally, any suitable element capable of seating a hitch ball (17) consistent with the principles discussed herein may be utilized, made of any suitable material and in any suitable configuration as appropriate. For example, in some embodiments a hitch ball seat element may be a hitch ball seat cone (26) located at the terminus of a trailer coupling path (27) and having a socket engagement surface (16) forming at least part of a hitch ball socket (15). In some embodiments, the hitch ball socket (15) may be completed by moving a rotary socket member (8) from a hitch ball clearance position (7) to a hitch ball socket position (11), perhaps as described elsewhere herein. Moreover, engaging part or all of a hitch ball (17) may involve substantially spherically wrapping about a hitch ball (17).

In some embodiments, the hitch ball seat cone (26) may be joined to, continuous with, or even an integrated part of a hitch ball guidance cone (21). Accordingly, seating a hitch ball (17) may involve moving the hitch ball (17) through a trailer coupling path (27), perhaps guided by a hitch ball guidance cone (21) through which the trailer coupling path (27) may be disposed, and into a hitch ball seat cone (26) located at the terminus of the trailer coupling path (27). Of course, a hitch ball (17) seated in a hitch ball socket (15) formed at least in part by a hitch ball seat cone (26) may have a trailer stabilization pin (20) disposed within a recessed space (18), perhaps as described elsewhere herein.

Figure 9:
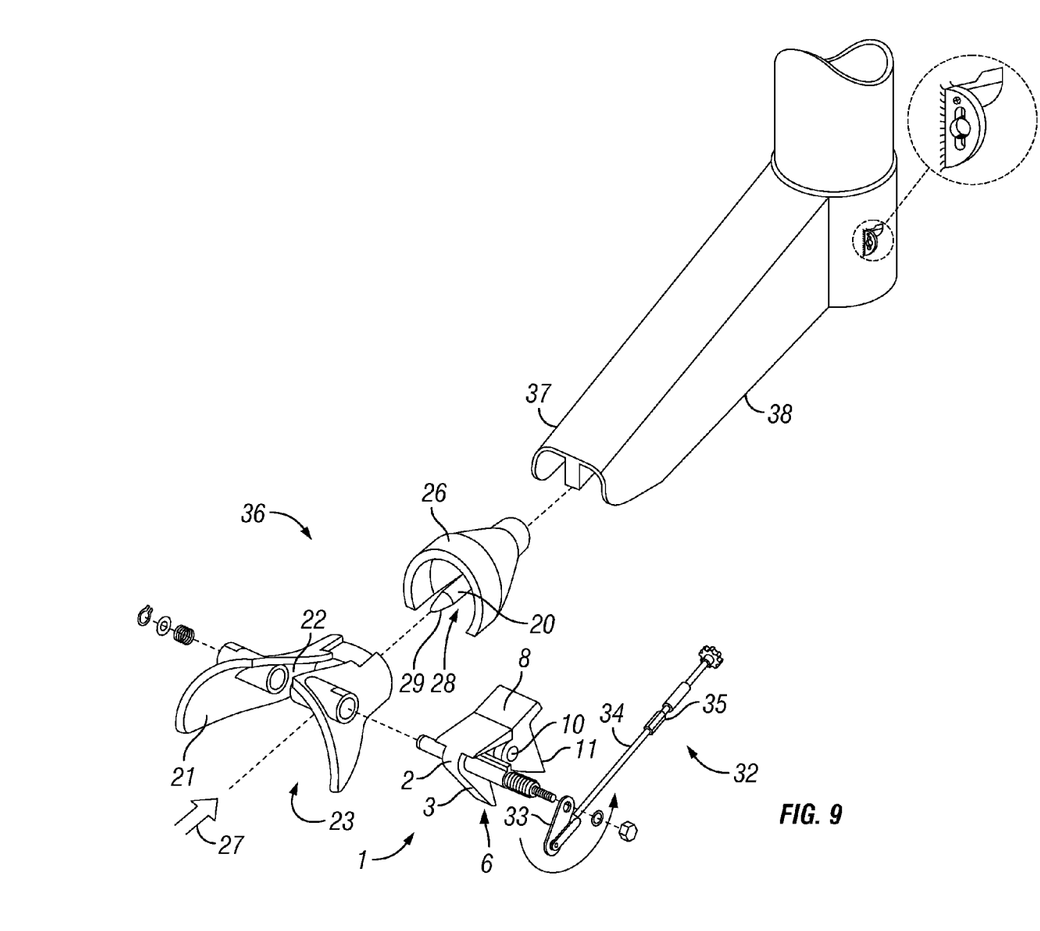
FIG. 9 is an exploded perspective view of a bifurcated trailer hitch apparatus having a hitch ball guidance cone, a hitch ball seat cone, and a supplemental lock element in one exemplary embodiment.
Figure 10:
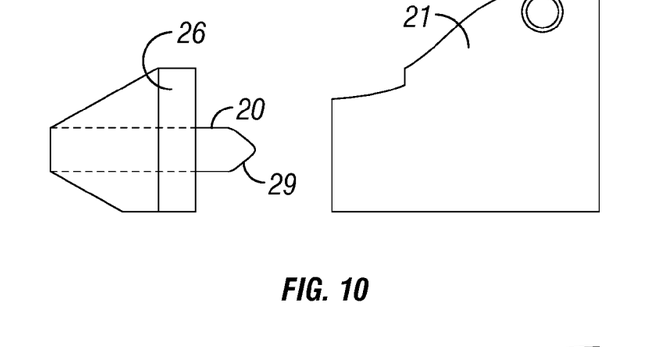
FIG. 10 is a side view of a hitch ball guidance cone and a hitch ball seat cone in one exemplary embodiment.
Figure 11:
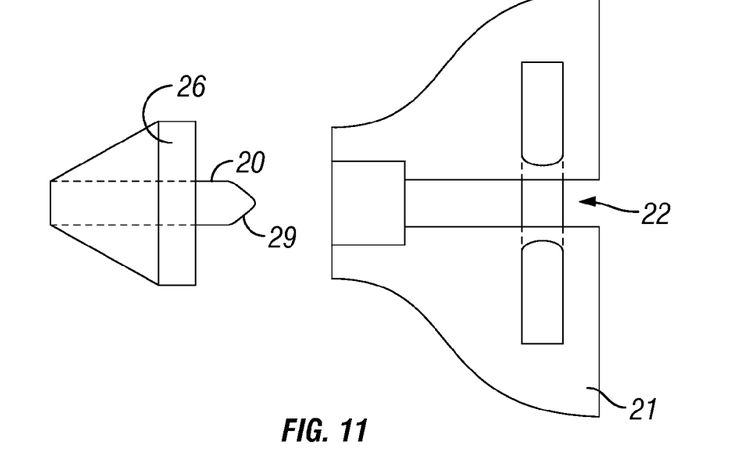
FIG. 11 is a top view of a hitch ball guidance cone and a hitch ball seat cone in one exemplary embodiment.
Figure 12:
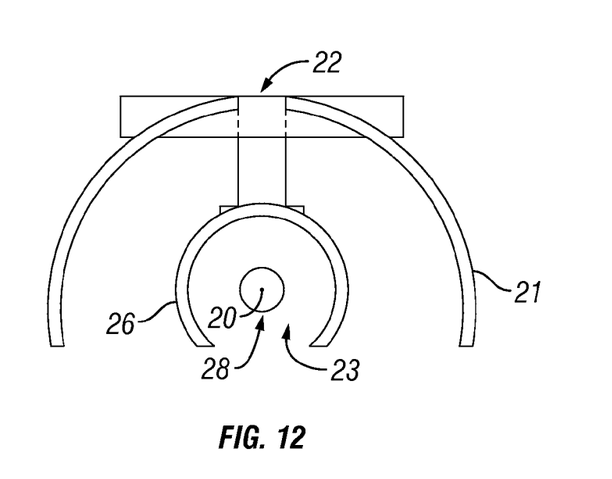
FIG. 12 is a front view of a hitch ball guidance cone and a hitch ball seat cone in one exemplary embodiment.

Now with reference primarily to FIG. 9, a bifurcated trailer hitch apparatus (1) may include a supplemental lock element (32). The supplemental lock element (32) may be configured to apply a supplemental locking force to a rotary socket member (8) in a hitch ball socket position (11), and to release the rotary socket member (8) from an engaged hitch ball socket position (11) to a released position. The supplemental lock element (32) may include lever arm (33) laterally displaced from a rotary interference member (2). One end of lever arm (33) may coincide with and be configured to rotate about the rotational axis of the first pivot point (4), while the other end may be joined to a control rod (34). In this manner, the control rod (34) may be configured to rotate rotary interference member (2) about the rotational axis of the first pivot point (4) through the action of lever arm (33). In some embodiments, for example, pushing forward and down on control rod (34) may cause rotary interference member (2) to move into a hitch ball interference position (6) and rotary socket member (8) to move into a hitch ball socket position (11). Conversely, pulling backward and up on control rod (34) may cause rotary interference member (2) and rotary socket member (8) to move into a hitch ball clearance position (7).

A supplemental lock element (32) further may include a variable lever position lock (35) capable of locking lever arm (33) in a fixed position. For example, in some embodiments a variable lever position lock (35) may be a locking element on control rod (34) by which varied positions of control rod (34) corresponding to varied positions of lever arm (33) may be locked down. Such varied positions of lever arm (33) may include an engaged lever position, as wherein lever arm (33) is positioned so that rotary interference member (2) is in a hitch ball interference position (6) and rotary socket member (8) is in a hitch ball socket position (11), such as shown for example in FIG. 6. The varied positions of lever arm (33) also may include a released lever position, as wherein rotary interference member (2) and rotary socket member (8) are in a hitch ball clearance position (7), such as shown for example in FIG. 5. It may be appreciated that when lever arm (33) is in an engaged lever position, the supplemental lock element (32) may apply a supplemental locking force to a rotary socket member (8) in a hitch ball socket position (11), such as shown for example in FIG. 6. When lever arm (33) is in a released position, the position of rotary interference member (2) and rotary socket member (8) in a hitch ball clearance position (7) may permit hitch ball (17) to be withdrawn from hitch ball socket (15) along trailer coupling path (27), such as shown for example in FIG. 5. The released position of lever arm (33) also may be utilized to admit hitch ball (17) into ball socket (15) in as much as rotary interference member (2) and rotary socket member (8) may be in hitch ball clearance position (7), again perhaps as shown in FIG. 5.

With further reference primarily to FIG. 9, embodiments may involve a trailer hitch assembly (36) joined to a distal end portion (37) of an elongate extension coupling (38) of a trailer. The trailer hitch assembly may include the rotary interference member (2) and the rotary socket member (8) described herein, and may permit the trailer to be coupled to a hitch ball mounted on a tow vehicle, such as a pickup truck.

Now with reference to all of the Figures, the embodiments described herein of course need not be limited to the pivot points and rotary motions of the exemplary embodiments described in the foregoing. Any kinetic modality suitable to accomplish the movements described herein may be utilized to practice the inventive technology. For example, in some embodiments the inventive technology is contemplated to include sliders, perhaps in combination with plates or gears, rather than pivot points.

Accordingly, the description herein should be understood to include an apparatus comprising: a movable interference member having a hitch ball contact surface; a first movement element of said movable interference member defining a range of motion of said movable interference member, an unobstructed path coincident with said range of motion of said movable interference member through said first movement element and including a hitch ball interference position and a hitch ball clearance position; a movable socket member having a socket engagement surface; a second movement element by which said movable socket member is joined to said movable interference member and defining a range of motion of said movable socket member; an unobstructed path coincident with said range of motion of said movable socket member through said second movement element and including a hitch ball clearance position and a hitch ball socket position.

Similarly, the description herein should be understood to include a method comprising: moving a hitch ball through a trailer coupling path; contacting said hitch ball to a hitch ball contact surface of a movable interference member in a hitch ball interference position; displacing said movable interference member from said hitch ball interference position to a hitch ball clearance position through an unobstructed path coinciding with a range of motion of said movable interference member defined by a first movement element of said movable interference member; displacing a movable socket member having a socket engagement surface from a hitch ball socket position to a hitch ball clearance position through an unobstructed path coinciding with a range of motion of said movable socket member defined by a second movement element by which said movable socket member is joined to said movable interference member.

As may be easily understood from the foregoing, the basic concepts of the present inventive technology may be embodied in a variety of ways. It involves both coupling techniques as well as devices to accomplish the appropriate coupling. In this application, the coupling techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "rotary interference member" should be understood to encompass disclosure of the act of "rotating an interference member"—whether explicitly discussed or not—and, conversely, were there effectively disclosure of the act of "rotating an interference member", such a disclosure should be understood to encompass disclosure of a "rotary interference member" and even a "means for rotating an interference member." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. U.S. Patent Documents

| DOCUMENT NO. & KIND CODE (if known) | PUB'N DATE mm-dd-yyyy | PATENTEE OR APPLICANT NAME |
| --- | --- | --- |
| 20090121452 | 05/14/2009 | Zilm |
| 7,588,262 | 09/15/2009 | Zilm |
| 5,890,728 | 04/06/1999 | Zilm |
| 6,186,530 | 02/13/2001 | Zilm |

II. Foreign Patent Documents

| FOREIGN PATENT DOCUMENT | PUB'N DATE mm-dd-yyyy | PATENTEE OR APPLICANT NAME |
| --- | --- | --- |
| WO05095130A1 | 10/13/2005 | Weber et al |
| WO09064796A1 | 05/22/2009 | Zilm |
| AU 736 557 | 05/11/2001 | Zilm |
| CA 2235167 | 12/13/2005 | Zilm |

Thus, the applicant(s) should be understood to have support to claim and make a statement of invention to at least: i) each of the coupling devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A bifurcated trailer hitch apparatus comprising:
a movable interference member having a hitch ball contact surface;
a first movement element of said movable interference member defining a range of motion of said movable interference member,
an unobstructed path coincident with said range of motion of said movable interference member through said first movement element and including a hitch ball interference position and a hitch ball clearance position;
a movable socket member having a socket engagement surface;
a second movement element by which said movable socket member is joined to said movable interference member and defining a range of motion of said movable socket member;
a unobstructed path coincident with said range of motion of said movable socket member through said second movement element and including a hitch ball clearance position and a hitch ball socket position.

2. A bifurcated trailer hitch apparatus comprising:
a rotary interference member having a hitch ball contact surface;
a first pivot point of said rotary interference member defining a rotational range of motion of said rotary interference member,
an unobstructed arc coincident with said rotational range of motion of said rotary interference member about said first pivot point from a hitch ball interference position to a hitch ball clearance position;
a rotary socket member having a socket engagement surface;
a second pivot point about which said rotary socket member is joined to said rotary interference member and defining a rotational range of motion of said rotary socket member;
a unobstructed arc coincident with said rotational range of motion of said rotary socket member about said second pivot point from a hitch ball clearance position to a hitch ball socket position.

3. A bifurcated trailer hitch apparatus as described in claim 2 wherein said rotary interference member comprises a cam arm and wherein said rotary socket member comprises a cam.

4. A bifurcated trailer hitch apparatus as described in claim 2 further comprising a bias of said rotary interference member toward said hitch ball interference position.

5. A bifurcated trailer hitch apparatus as described in claim 4 wherein said rotary socket member comprises a rotary socket member held against a bias into a hitch ball socket position.

6. A bifurcated trailer hitch apparatus as described in claim 5 wherein said bias of said rotary interference member comprises a relatively stronger bias and wherein said bias of said rotary socket member comprises a relatively weaker bias.

7. A bifurcated trailer hitch apparatus as described in claim 6 wherein each said bias comprises a spring loaded bias.

8. A bifurcated trailer hitch apparatus as described in claim 2 wherein said second pivot point comprises a sub-medial lock axis position when said rotary interference member and said rotary socket member are located in said hitch ball interference position.

9. A bifurcated trailer hitch apparatus as described in claim 2 wherein said first pivot point and said second pivot point comprise counter-rotational pivot points.

10. A bifurcated trailer hitch apparatus as described in claim 2 further comprising a pivot counteraction safety latch.

11. A bifurcated trailer hitch apparatus as described in claim 2 further comprising a hitch ball socket formed at least in part by said socket engagement surface of said rotary socket member.

12. A bifurcated trailer hitch apparatus as described in claim 11 wherein said hitch ball socket formed at least in part by said socket engagement surface of said rotary socket member further comprises a hitch ball socket formed at least in part by a socket engagement surface of a hitch ball seat element.

13. A bifurcated trailer hitch apparatus as described in claim 12 wherein said socket engagement surface of said rotary socket member and said socket engagement surface of said hitch ball seat element comprise socket engagement surfaces configured to substantially spherically wrap about a hitch ball.

14. A bifurcated trailer hitch apparatus as described in claim 11 further comprising a hitch ball seated in said hitch ball socket.

15. A bifurcated trailer hitch apparatus as described in claim 14 wherein said hitch ball comprises a hitch ball having a recessed space disposed into a socket reception surface of said hitch ball, and further comprising a trailer stabilization pin disposed within said recessed space disposed into said socket reception surface of said hitch ball.

16. A bifurcated trailer hitch apparatus as described in claim 15 wherein said trailer stabilization pin comprises a trailer yaw counteraction pin.

17. A bifurcated trailer hitch apparatus as described in claim 2 further comprising a hitch ball guidance element.

18. A bifurcated trailer hitch apparatus as described in claim 17 wherein said hitch ball guidance element comprises a hitch ball guidance cone disposed about said rotary interference member and said rotary socket member.

19. A bifurcated trailer hitch apparatus as described in claim 18 wherein said rotary interference member comprises a rotary interference member suspended within said hitch ball guidance cone.

20. A bifurcated trailer hitch apparatus as described in claim 19 further comprising a superior clearance opening disposed through said hitch ball guidance cone configured to accommodate each said unobstructed arc coincident with each said rotational range of motion of said rotary interference member and said rotary socket member.

21. A bifurcated trailer hitch apparatus as described in claim 18 further comprising an inferior clearance opening disposed through said hitch ball guidance cone configured to accommodate a hitch ball trailer coupling path.

22. A bifurcated trailer hitch apparatus as described in claim 21 wherein said inferior clearance opening comprises an inferior clearance opening having an angular width of up to 120 degrees.

23. A bifurcated trailer hitch apparatus as described in claim 18 wherein said rotary interference member and said rotary socket member comprise a flush interior surface of said hitch ball guidance cone when said rotary interference member and said rotary socket member are located in said hitch ball clearance position.

24. A bifurcated trailer hitch apparatus as described in claim 17 further comprising a hitch ball seat element.

25. A bifurcated trailer hitch apparatus as described in claim 24 wherein said hitch ball seat element comprises a hitch ball seat cone located at the terminus of a hitch ball trailer coupling path disposed through the hitch ball guidance element.

26. A bifurcated trailer hitch apparatus as described in claim 24 further comprising a hitch ball socket formed at least in part by a socket engagement surface of said hitch ball seat element.

27. A bifurcated trailer hitch apparatus as described in claim 26 wherein said hitch ball socket formed at least in part by said socket engagement surface of said hitch ball seat element further comprises a hitch ball socket formed at least in part by said socket engagement surface of said rotary socket member.

28. A bifurcated trailer hitch apparatus as described in claim 26 wherein said socket engagement surface of said hitch ball seat element and said socket engagement surface of said rotary socket member comprise socket engagement surfaces configured to substantially spherically wrap about a hitch ball.

29. A bifurcated trailer hitch apparatus as described in claim 26 further comprising a trailer stabilization pin disposed into a hitch ball socket space of said hitch ball socket.

30. A bifurcated trailer hitch apparatus as described in claim 29 further comprising a hitch ball seated within said hitch ball socket, wherein said hitch ball comprises a hitch ball having a recessed space disposed into a socket reception surface of said hitch ball, and further comprising the trailer stabilization pin disposed within said recessed space disposed into said socket reception surface of said hitch ball.

31. A bifurcated trailer hitch apparatus as described in claim 30 wherein said trailer stabilization pin comprises a yaw counteraction pin.

32. A bifurcated trailer hitch apparatus as described in claim 30 further comprising a pin taper of said trailer stabilization pin and a recess taper of said recessed space configured to form an alignment tolerance.

33. A bifurcated trailer hitch apparatus as described in claim 32 wherein said alignment tolerance comprises an alignment tolerance of up to 18 degrees off-center.

34. A bifurcated trailer hitch apparatus as described in claim 2 further comprising a supplemental lock element.

35. A bifurcated trailer hitch apparatus as described in claim 34 wherein said supplemental lock element comprises a lever arm laterally displaced from said rotary interference member and configured to rotate said rotary interference member about the rotational axis of said first pivot point.

36. A bifurcated trailer hitch apparatus as described in claim 35 further comprising a control rod joined to said lever arm and configured to rotate said lever arm about said rotational axis of said first pivot point and having a variable lever position lock selected from the group consisting of an engaged lever position lock and a released lever position lock.

37. A bifurcated trailer hitch apparatus as described in claim 2 wherein said rotary interference member and said rotary socket member comprise a trailer hitch assembly joined to a distal end portion of an elongate extension coupling of a trailer.

38. A bifurcated trailer hitch apparatus comprising:
a hitch ball guidance cone disposed about a rotary interference member and a rotary socket member;
a hitch ball seat cone located at the terminus of a hitch ball trailer coupling path disposed through said hitch ball guidance cone;
a hitch ball contact surface of said rotary interference member;
a first pivot point of said rotary interference member defining a rotational range of motion of said rotary interference member,
an unobstructed arc coincident with said rotational range of motion of said rotary interference member about said first pivot point from a hitch ball interference position to a hitch ball clearance position;
a socket engagement surface of said rotary socket member;
a second pivot point about which said rotary socket member is joined to said rotary interference member and defining a rotational range of motion of said rotary socket member;
a unobstructed arc coincident with said rotational range of motion of said rotary socket member about said second pivot point from a hitch ball clearance position to a hitch ball socket position;
a lever arm laterally displaced from said rotary interference member and configured to rotate said rotary interference member about the rotational axis of said first pivot point;
a control rod joined to said lever arm and configured to rotate said lever arm about said rotational axis of said first pivot point and having a variable lever position lock selected from the group consisting of an engaged lever position lock and a released lever position lock.

39. A bifurcated method for hitching a trailer comprising the steps of:
moving a hitch ball through a trailer coupling path;
contacting said hitch ball to a hitch ball contact surface of a rotary interference member in a hitch ball interference position;
displacing said rotary interference member from said hitch ball interference position to a hitch ball clearance position through an unobstructed arc coinciding with a rotational range of motion of said rotary interference member defined by a first pivot point of said rotary interference member;
displacing a rotary socket member having a socket reception surface from a hitch ball socket position to a hitch ball clearance position through an unobstructed arc coinciding with a rotational range of motion of said rotary socket member defined by a second pivot point about which said rotary socket member is joined to said rotary interference member.

40. A bifurcated method of hitching a trailer comprising the steps of:
moving a hitch ball through a trailer coupling path;
contacting said hitch ball to a hitch ball contact surface of a movable interference member in a hitch ball interference position;
displacing said movable interference member from said hitch ball interference position to a hitch ball clearance position through an unobstructed path coinciding with a range of motion of said movable interference member defined by a first movement element of said movable interference member;
displacing a movable socket member having a socket engagement surface from a hitch ball socket position to a hitch ball clearance position through an unobstructed path coinciding with a range of motion of said movable socket member defined by a second movement element by which said movable socket member is joined to said movable interference member.

41. A bifurcated method for hitching a trailer comprising the steps of:
confining movement of a hitch ball within a hitch ball guidance cone disposed about a rotary interference member and a rotary socket member;
contacting said hitch ball to a hitch ball contact surface of said rotary interference member in a hitch ball interference position;
displacing said rotary interference member from said hitch ball interference position to a hitch ball clearance position through an unobstructed arc coinciding with a rotational range of motion of said rotary interference member defined by a first pivot point of said rotary interference member;
displacing the rotary socket member having a socket reception surface from a hitch ball socket position to a hitch ball clearance position through an unobstructed arc coinciding with a rotational range of motion of said rotary socket member defined by a second pivot point about which said rotary socket member is joined to said rotary interference member;
moving said hitch ball into a hitch ball seat cone located at the terminus of a hitch ball trailer coupling path disposed through said hitch ball guidance cone;
rotating said rotary interference member about said first pivot point with a lever arm laterally displaced from said rotary interference member utilizing a control rod joined to said lever arm;
locking said lever arm with said control rod into a position selected from the group consisting of an engaged lever position and a released lever position.

* * * * *